FORMING A SEMICONDUCTOR DEVICE BY DIFFUSING

Filed Jan. 6, 1966

3,398,030
Patented Aug. 20, 1968

3,398,030

FORMING A SEMICONDUUCTOR DEVICE BY DIFFUSING

Douglas Frederick Ridley, Solihull, England, assignor to Joseph Lucas (Industries) Limited, Birmingham, England Filed Jan. 6, 1966, Ser. No. 519,046
Claims priority, application Great Britain, Jan. 8, 1965, 884/65
1 Claim. (Cl. 148—187)

ABSTRACT OF THE DISCLOSURE

A p-n-p or n-p-n structure is manufactured in a single diffusion step by masking and etching a slice to form a raised portion on one face of the slice. Then the other face of the slice is faced to mask, which is approximately opposite the raised portion, and divides the opposite face of the slice into an inner unmasked region which lies entirely within the area of the raised portion and an outer unmasked region. An impurity of the opposite conductivity type to the slice is then diffused in both sides thereof, the result is a three-layer device.

This invention relates to the manufacture of a three-layer semiconductor slice which can be used as a transistor or can be subjected to further treatment to form a four-layer device.

The invention resides in a method of manufacturing a three-layer semiconductor slice, the method comprising forming on one face of a slice of one conductivity type a raised area, spaced from the periphery of the slice, masking a region of the opposite face of the slice to divide said opposite face into an outer unmasked region, and an inner unmasked region which is separated from the outer region and lies entirely within the area of said raised portion when projected onto said opposite face, and diffusing impurity of the opposite conductivity type into the slice until the slice has three layers with the junctions beween the three layers on said opposite face.

Figure 1:
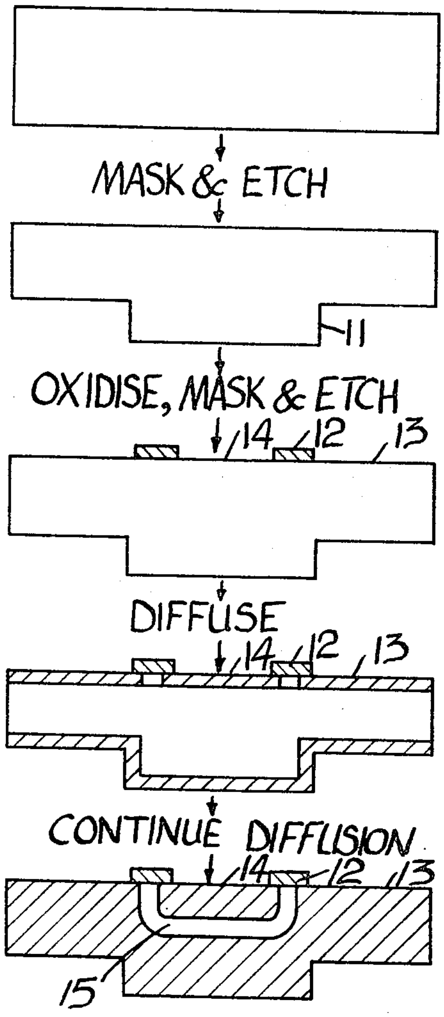
Figure 2:
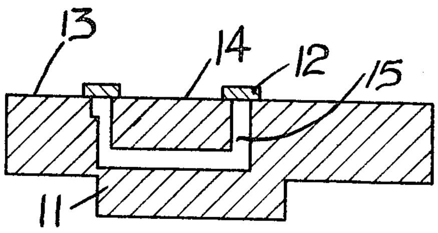

In the accompanying drawings, FIGURE 1 is a flow sheet illustrating one example of the invention, and FIGURE 2 illustrates an alternative construction.

Referring to FIGURE 1, a slice of silicon which may be n-type or p-type is lapped to the required size, and is then masked and etched to form a raised area 11 on one face, which for convenience will be considered to be the lower face of the slice. The slice is then oxidised to form a surface oxide layer, an annular portion of which is masked, after which the oxide layer is removed by etching to leave an annular region 12 of oxide on the upper face of the slice. It will be observed that the region 12 divides the upper face into an outer unmasked region 13, and an inner unmasked region 14 which is separated from the outer region and lies entirely within the area of the raised area 11 when projected onto the upper face.

Assuming that the slice is n-type, a p-type impurity is now diffused into the slice, it being understood that for a p-type slice an n-type impurity would be used. The impurity diffuses into the slice except for the annular region 12, and as indicated diffusion is continued until the entire slice beneath the region 13 is p-type. At this stage diffusion is stopped, and by virtue of the raised portion 11 the slice will still include an n-type zone 15 beneath the region 12. Thus, a single diffusion process has produced a three layer slice with both junctions on the upper face. The impurity will of course spread beneath the oxide layer forming the region 12, so that the junctions are protected in known manner.

It is clear that if the three layers are to be separated, the region 14 must lie within the projected area of the the slice will still include an n-type zone 15 beneath the portion 11 by a distance greater than the lateral spread of impurity under the region 12, and references in this specification to the position of the region 14 are to be interpreted accordingly.

In FIGURE 1, the inner and outer peripheries of the region 12 lie within the raised portion 11, but as indicated in FIGURE 2 the outer periphery can lie only partly within the portion 11, or it could lie entirely outside the portion 11.

The area 11 need not be centrally disposed, but it must not extend to the edge of the slice, or else the zone 15 will extend to the edge of the slice, which is unacceptable.

The slice can of course be created further to form a semiconductor device, and in one example a further n-type zone is formed in the region 14 to form a thyristor, the anode, gate and cathode contacts being made to the regions 13, 14 and the newly formed n-type region respectively.

Having now described my invention what I claim as new and desire to secure by Letters Patent is:

1. A method of manufacturing a three-layer semiconductor slice comprising the following steps:

(i) treating a slice of one conductivity type to form on one face thereof a raised area which is spaced from the periphery of the slice, (ii) masking a region of the opposite face to the one having the raised area to divide said opposite face into an outer unmasked region and an inner unmasked region which is separated from the outer unmasked region by the mask, said inner unmasked region being entirely within the area of said raised portion when projected onto said opposite face, and the lateral spread of said mask being sufficient to ensure that when an impurity of the opposite conductivity type to said slice is diffused into both the inner and outer unmasked regions, the lateral spread of the impurity of said opposite conductivity type will not be sufficient to cause said impurity to spread entirely beneath said mask, (iii) diffusing an impurity of said opposite conductivity type into both faces of the slice to form the slice with three layers, wherein the junctions of said three layers extend to the surface of said opposite face and also define a channel portion within said projected area of said raised portion.

References Cited

UNITED STATES PATENTS

| | | | |
|---|---|---|---|
| 3,064,167 | 11/1962 | Hoerni | 148—187 XR |
| 3,156,591 | 11/1964 | Hale et al. | 148—175 |
| 3,164,500 | 1/1965 | Benda | 148—186 |
| 3,183,129 | 5/1965 | Tripp | 148—186 |
| 3,197,681 | 5/1965 | Broussard. | |
| 3,220,896 | 11/1965 | Miller | 148—187 XR |
| 3,281,915 | 11/1966 | Schramm | 148—187 XR |

HYLAND BIZOT, *Primary Examiner.*